US006992152B2

(12) United States Patent
Lobue et al.

(10) Patent No.: US 6,992,152 B2
(45) Date of Patent: Jan. 31, 2006

(54) APPARATUS AND METHOD FOR CONTROLLING OLEFIN POLYMERIZATION PROCESS

(75) Inventors: Christopher Lobue, Montgomery, TX (US); Gilbert Valdez, Pearland, TX (US); Daniel Herndon, League City, TX (US); C. Edward Baxter, Jr., League City, TX (US); Russell E. Reid, Sr., Dayton, TX (US)

(73) Assignee: Texas Petrochemicals LP, Houston, TX (US)

( * ) Notice: Subject to any disclaimer, the term of this patent is extended or adjusted under 35 U.S.C. 154(b) by 0 days.

(21) Appl. No.: 10/922,181

(22) Filed: Aug. 19, 2004

(65) Prior Publication Data

US 2005/0019227 A1    Jan. 27, 2005

Related U.S. Application Data

(63) Continuation-in-part of application No. 10/434,805, filed on May 9, 2003, now Pat. No. 6,858,188, and a continuation-in-part of application No. 10/208,234, filed on Jul. 30, 2002, which is a continuation of application No. 09/665,084, filed on Sep. 20, 2000, now Pat. No. 6,525,149, which is a continuation-in-part of application No. 09/515,790, filed on Feb. 29, 2000, now Pat. No. 6,562,913.

(60) Provisional application No. 60/160,357, filed on Oct. 19, 1999.

(51) Int. Cl.
*C08F 2/02* (2006.01)

(52) U.S. Cl. .......................... 526/64; 526/88; 526/237; 526/348.7; 526/521; 526/525; 526/348.2; 526/348.3; 526/348.4; 526/348.5

(58) Field of Classification Search .................. 526/64, 526/88, 237, 348.7, 348.2, 348.3, 348.4, 526/348.5, 348.1, 521, 525; 585/521, 525
See application file for complete search history.

(56) References Cited

U.S. PATENT DOCUMENTS

| 132,264 A | 10/1872 | Earnes et al. |
| 2,139,038 A | 12/1938 | Russell |
| 2,379,656 A | 7/1945 | Ruthruff |
| 2,407,494 A | 9/1946 | Hartvigsen |
| 2,411,097 A | 11/1946 | Kopp |
| 2,559,062 A | 7/1951 | Domte |

(Continued)

FOREIGN PATENT DOCUMENTS

CA        2195575        2/1996

(Continued)

*Primary Examiner*—William K. Cheung
(74) *Attorney, Agent, or Firm*—James H. Marsh, Jr.; Stinson Morrison Hecker LLP

(57) ABSTRACT

Apparatus for olefin polymerization includes one or more shell and tube olefin polymerization reactors, each of which has an olefin polymerization reaction mixture inlet connection and a crude polyolefin product outlet connection. Each reactor is equipped with a recirculation system including a pump arranged to circulate a reaction mixture through the tube side of the reactor independently of the introduction of olefin polymerization reaction mixture into the reactor. The apparatus may also include an inlet reaction mixture distribution manifold and an outlet polymerization reaction mixture collection manifold interconnecting the reactors for operation in parallel. The apparatus also includes catalyst composition and catalyst modifier inlets for each reactor arranged such that a catalyst modifier to may be introduced into each reactor at a rate which is independent of the introduction of catalyst composition.

36 Claims, 2 Drawing Sheets

U.S. PATENT DOCUMENTS

| | | |
|---|---|---|
| 2,559,984 A | 7/1951 | Montgomery et al. |
| 2,727,022 A | 12/1955 | Linsk |
| 2,833,840 A | 5/1958 | Longwell |
| 2,856,395 A | 10/1958 | Richard, Jr. et al. |
| 2,889,370 A | 6/1959 | Schechter |
| 2,918,508 A | 12/1959 | Coopersmith et al. |
| 3,024,226 A | 3/1962 | Nolan, Jr. et al. |
| 3,166,546 A | 1/1965 | Nolan, Jr. et al. |
| 3,284,537 A | 11/1966 | Webb, Jr. |
| 3,306,907 A | 2/1967 | McNinch et al. |
| 3,346,354 A | 10/1967 | Kautsky et al. |
| 3,382,291 A | 5/1968 | Brennan |
| 3,634,383 A | 1/1972 | Miller, Jr. |
| 3,726,842 A | 4/1973 | Treischmann et al. |
| 3,778,487 A | 12/1973 | Driscoll et al. |
| 3,780,128 A | 12/1973 | Shubkin |
| 3,849,085 A | 11/1974 | Kreuz et al. |
| 3,927,041 A | 12/1975 | Cengel et al. |
| 3,935,249 A | 1/1976 | Puskas et al. |
| 3,991,129 A | 11/1976 | Daniels |
| 4,110,521 A | 8/1978 | Barnett et al. |
| 4,152,499 A | 5/1979 | Boerzel et al. |
| 4,227,027 A | 10/1980 | Booth et al. |
| 4,231,759 A | 11/1980 | Udelhofen et al. |
| 4,238,628 A | 12/1980 | Cahill et al. |
| 4,242,531 A | 12/1980 | Carter |
| 4,311,808 A | 1/1982 | Su |
| 4,383,093 A | 5/1983 | Shiraki et al. |
| 4,391,959 A | 7/1983 | Fauth et al. |
| 4,400,493 A | 8/1983 | Abernathy, Jr. et al. |
| 4,429,099 A | 1/1984 | Kennedy et al. |
| 4,433,197 A | 2/1984 | Vogel et al. |
| 4,465,819 A | 8/1984 | Kosanovich et al. |
| 4,558,104 A | 12/1985 | Bronstart et al. |
| 4,605,808 A | 8/1986 | Samson |
| 4,663,406 A | 5/1987 | Bronstert et al. |
| 4,691,072 A | 9/1987 | Schick et al. |
| 4,849,572 A | 7/1989 | Chen et al. |
| 4,883,847 A | 11/1989 | Leung et al. |
| 4,914,166 A | 4/1990 | Kennedy et al. |
| 4,943,616 A | 7/1990 | Mishra et al. |
| 4,956,512 A | 9/1990 | Nissfolk et al. |
| 4,973,733 A | 11/1990 | Valkovich et al. |
| 4,982,042 A | 1/1991 | Akatsu et al. |
| 5,068,490 A | 11/1991 | Eaton |
| 5,175,225 A | 12/1992 | Ruhe, Jr. |
| 5,191,044 A | 3/1993 | Rath et al. |
| 5,192,335 A | 3/1993 | Cherpeck |
| 5,254,649 A | 10/1993 | Miln et al. |
| 5,254,784 A | 10/1993 | Nurminen et al. |
| 5,286,823 A | 2/1994 | Rath |
| 5,300,701 A | 4/1994 | Cherpeck |
| 5,408,018 A | 4/1995 | Rath |
| 5,439,991 A | 8/1995 | Colman et al. |
| 5,448,001 A | 9/1995 | Baird |
| 5,563,313 A | 10/1996 | Chung et al. |
| 5,710,225 A | 1/1998 | Johnson et al. |
| 5,731,379 A | 3/1998 | Kennan et al. |
| 5,733,993 A | 3/1998 | Yu et al. |
| 5,767,334 A | 6/1998 | Nissfolk et al. |
| 5,779,742 A | 7/1998 | Baker |
| 5,792,729 A | 8/1998 | Harrison et al. |
| 5,811,616 A | 9/1998 | Holub et al. |
| 5,814,706 A | 9/1998 | Yu et al. |
| 5,910,550 A | 6/1999 | Rath |
| 5,962,604 A | 10/1999 | Rath |
| 5,977,251 A | 11/1999 | Kao et al. |
| 6,132,827 A | 10/2000 | Miro |
| 6,361,856 B1 | 3/2002 | Wakai et al. |
| 6,384,154 B1 | 5/2002 | Sigwart et al. |
| 6,407,186 B1 | 6/2002 | Rath et al. |
| 6,441,110 B1 | 8/2002 | Sigwart et al. |
| 6,479,598 B1 * | 11/2002 | Lewtas et al. ................. 526/69 |
| 6,525,149 B1 * | 2/2003 | Baxter, Jr. et al. .......... 526/133 |
| 6,562,913 B1 * | 5/2003 | Baxter, Jr. et al. ............ 526/64 |
| 6,642,329 B1 | 11/2003 | Rath |
| 2003/0162918 A1 | 8/2003 | Wettling et al. |
| 2003/0191257 A1 | 10/2003 | Wettling et al. |

FOREIGN PATENT DOCUMENTS

| | | |
|---|---|---|
| CA | 2217848 | 12/1996 |
| CA | 2334263 | 12/1999 |
| DE | 27 02 604 | 4/1978 |
| DE | 159 92 016 | 7/1981 |
| DE | 199 52 030 | 5/2001 |
| EP | 0 145 235 A1 | 6/1985 |
| EP | 0 279 456 A1 | 8/1988 |
| EP | 0 322 241 A1 | 6/1989 |
| EP | 0 355 997 A1 | 2/1990 |
| EP | 0 400 905 A1 | 12/1990 |
| EP | 0 481 297 A2 | 4/1992 |
| EP | 0 628 575 A1 | 12/1994 |
| EP | 0 671 419 A1 | 9/1995 |
| EP | 0 831 141 | 3/1998 |
| EP | 0 628 022 B1 | 11/1998 |
| GB | 1 159 368 | 7/1969 |
| GB | 2 181 145 | 4/1987 |
| WO | WO 93/10063 | 5/1993 |
| WO | WO 94/14739 | 4/1994 |
| WO | WO 99/31151 | 6/1999 |
| WO | WO 99/64482 | 12/1999 |
| WO | WO 01/19873 | 3/2001 |
| WO | WO 01/27172 | 4/2001 |
| WO | WO 02/06359 | 1/2002 |
| WO | WO 02/14385 | 2/2002 |

* cited by examiner

APPARATUS AND METHOD FOR CONTROLLING OLEFIN POLYMERIZATION PROCESS

CROSS REFERENCE TO RELATED APPLICATIONS

This application is a continuation-in-part of presently pending utility patent application Ser. No. 10/434,805 filed May 9, 2003 now U.S. Pat. No. 6,858,188. This application is also a continuation-in-part of presently utility patent application Ser. No. 10/208,234 filed Jul. 30, 2002, which in turn is a continuation of utility patent application Ser. No. 09/665,084 filed Sep. 20, 2000 (now U.S. Pat. No. 6,525,149), which again in turn is a continuation-in-part of utility patent application Ser. No. 09/515,790 filed Feb. 29, 2000 (now U.S. Pat. No. 6,562,913). Priority from each of said prior utility applications is claimed herein pursuant to 35 U.S.C. § 120. In addition, priority benefits under 35 U.S.C. §119(e) are claimed in this application from provisional application Ser. No. 60/160,357 filed Oct. 19, 1999. The entireties of the disclosures of said prior applications are hereby specifically incorporated herein by reference.

BACKGROUND OF THE INVENTION

The present invention relates to liquid phase olefin polymerization, to the preparation of polyolefin products and to apparatus useful in the preparation of polyolefin products. In particular the present invention relates to apparatuses and equipment for the preparation of a variety of polyolefin products using a liquid phase polymerization process and to the methodology used in the operation of such apparatuses and equipment. More specifically, the present invention relates to apparatus and methodology which enhances the operation and control of polyolefin reactors.

U.S. Pat. No. 6,562,913 issued on May 13, 2003 and entitled "Process For Producing High Vinylidene Polyisobutylene" (hereinafter the '913 patent) discloses, among other things, liquid phase polymerization processes for preparing low molecular weight, highly reactive polyisobutylene. In accordance with the disclosure of the '913 patent, a catalyst composition, which desirably may comprise a complex of $BF_3$ and methanol, and a feedstock containing isobutylene, are each introduced into a reaction zone where the same are intimately admixed with residual reaction mixture so as to present an intimately intermixed reaction admixture in the reaction zone. The intimately intermixed reaction admixture is maintained in its intimately intermixed condition and at a relatively constant temperature of at least about 0° C. while the same is in the reaction zone, whereby isobutylene therein is polymerized to form polyisobutylene (PIB) having a high degree of terminal unsaturation. A crude product stream comprising residual catalyst composition, unreacted isobutylene and polyisobutylene is then withdrawn from the reaction zone. The introduction of feedstock into and the withdrawal of product stream from the reaction zone are each controlled such that the residence time of the isobutylene undergoing polymerization in the reaction zone is no greater than about 4 minutes, whereby the product stream contains a highly reactive polyisobutylene product. Preferably, the reaction zone may be the tube side of a shell-and-tube exchanger in which a coolant is circulated on the shell side. A recirculation loop may desirably be employed to circulate the reaction admixture through the tube side reaction zone at a linear velocity sufficient to establish and maintain an intimately intermixed condition in the admixture and remove heat generated by the exothermic polymerization reaction.

U.S. Pat. No. 6,525,149 issued on Feb. 25, 2003 and entitled "Process For Preparing Polyolefin Products" (hereinafter the '149 patent) relates to a novel liquid phase polymerization process for preparing a polyolefin product having preselected properties. The process of the '149 patent includes the steps of providing a liquid feedstock which contains an olefinic component and a catalyst composition which may comprise a stable complex of $BF_3$ and a complexing agent. The feedstock may comprise any one or more of a number of olefins, including branched olefins such as isobutylene, $C_3$–$C_5$ linear alpha olefins and $C_4$–$C_5$ reactive non-alpha olefins. The feedstock and the catalyst composition may desirably be introduced into a residual reaction mixture recirculating in a loop reactor reaction zone provided on the tube side of a shell and tube heat exchanger at a recirculation rate sufficient to cause intimate intermixing of the residual reaction mixture, the added feedstock and the catalyst composition. The heat of the polymerization reaction is removed from the recirculating intimately intermixed reaction admixture at a rate calculated to provide a substantially constant reaction temperature therein while the same is recirculating in the reaction zone. The conditions in the reactor are appropriate for causing olefinic components introduced in the feedstock to undergo polymerization to form the desired polyolefin product in the presence of the catalyst composition. A crude product stream containing the desired polyolefin product, unreacted olefins and residual catalyst composition is withdrawn from the reaction zone. The introduction of the feedstock into the reaction zone and the withdrawal of the product stream from the reaction zone are controlled such that the residence time of the olefinic components undergoing polymerization in the reaction zone is appropriate for production of the desired polyolefin product.

U.S. Patent publication 2003-0040587 A1 published on Feb. 27, 2003 and entitled "Mid-Range Vinylidene Content Polyisobutylene Polymer Product And Process For Producing The Same" (hereinafter the '587 publication) describes a mid-range vinylidene content PIB polymer product and a process for making the same. In accordance with the disclosure of the '587 publication, at least about 90% of the PIB molecules present in the product comprise alpha or beta position isomers. The alpha (vinylidene) isomer content of the product may range from 20% to 70% thereof, and the content of tetra-substituted internal double bonds is very low, preferably less than about 5% and ideally less than about 1–2%. The mid-range vinylidene content PIB polymer products are desirably prepared by a liquid phase polymerization process conducted in a loop reactor similar to the reactors described in the '790 application and the '587 patent at a temperature which desirably may be about 60° F. or higher using a $BF_3$/methanol catalyst complex and a contact time of no more than about 4 minutes.

The '913 patent, the '587 publication and the '149 patent are each assigned to the assignee of the present application, and the entireties of the respective disclosures thereof are specifically incorporated herein by this reference thereto.

In conducting the reactions described above, highly specialized equipment may often be employed to enhance the operation and control of the polymerization reactors. In each case, for example, the crude product leaving the reactor may be contaminated with residual catalyst which desirably should be quickly quenched or killed to avoid further polymerization of monomers and low molecular weight oligomers without appropriate cooling and/or isomerization resulting from shifting of the position of the remaining double bond. The catalyst composition may be subjected to contamination by residual materials recirculating with the reaction admixture during the conduct of the polymerization reaction. Control of catalyst to catalyst complexing agent is often vital for producing a particular polymeric product. Moreover, as in any industrial activity, methodology and/or equipment for enhancing capacity and throughput are sought continually.

SUMMARY OF THE INVENTION

In one important aspect, the present invention provides an improved reactor apparatus for olefin polymerization. The apparatus of the invention comprises a reactor defining a reaction zone and including an inlet connection for an olefin polymerization reaction mixture and an outlet connection for an olefin polymerization reaction mixture, which connections are in fluid communication with said zone. The reactor is adapted and arranged to facilitate the conduct in said zone of an exothermic olefin polymerization reaction on an olefin polymerization reaction mixture in the presence of a catalyst composition comprising a catalyst and a catalyst modifier which may desirably be in the form of a catalyst complexing agent. The reactor further includes an inlet for introduction of an olefin containing feedstock into the reaction mixture in said zone, a recirculation system including a pump arranged and adapted to circulate said reaction mixture in said zone at a flow rate that is independent of the rate of introduction of olefin containing feedstock into said zone, and a catalyst composition inlet in fluid communication with said zone for introduction of a catalyst composition into the reaction mixture in said zone. In accordance with the invention, the reactor also includes at least one catalyst modifier inlet in fluid communication with said zone for introduction of a catalyst modifier into the reaction mixture in said zone at a rate which is independent of the rate of introduction of catalyst composition into the reaction mixture in said zone.

In a preferred form of the invention, the catalyst composition inlet may desirably be spaced from the catalyst modifier inlet. In addition, the catalyst composition inlet may desirably be connected to a pipe which is part of said recirculation system.

In another important aspect of the invention, a method is provided for conducting an olefin polymerization reaction. Broadly, the method of this aspect of the invention comprises recirculating an olefin polymerization reaction mixture in a reaction zone of an olefin polymerization reactor, introducing an olefin containing feedstock into said recirculated olefin polymerization reaction mixture, said olefin polymerization reaction mixture being recirculated at a flow rate which is independent of the rate of introduction of said feedstock into said zone, introducing a catalyst composition comprising a catalyst and a catalyst modifier into said reaction mixture, subjecting said polymerization reaction mixture to exothermic olefin polymerization reaction conditions in said zone in the presence of said catalyst composition, and introducing a catalyst modifier into said recirculating olefin polymerization reaction mixture at a rate which is independent of the rate of introduction of said catalyst composition into said zone.

In yet another important aspect, the invention provides a liquid phase polymerization process for preparing polyisobutylene. In accordance with this aspect of the invention, the process broadly comprises providing a feedstock comprising isobutylene, providing a catalyst composition comprising a complex of $BF_3$ and a complexing agent, introducing said feedstock and said catalyst composition into a reaction mixture in a reaction zone, intimately intermixing said reaction mixture, said feedstock and said catalyst composition to present an intimately intermixed reaction admixture in said reaction zone, maintaining the intimately intermixed reaction admixture in its intimately intermixed condition while the same is in said reaction zone, to thereby cause the isobutylene therein to undergo polymerization to form polyisobutylene, introducing an additional amount of said complexing agent into said intimately intermixed reaction admixture at a rate which is independent of the rate of introduction of said catalyst composition, and withdrawing a product stream comprising polyisobutylene from said reaction zone.

In a preferred form of the invention, the reaction zone may comprise a loop reactor wherein the reaction admixture is continuously recirculated at a first volumetric flow rate, and said feedstock and said catalyst composition may be continuously introduced at a combined second volumetric flow rate.

In further accordance with the concepts and principles of the invention, the complexing agent may ideally be comprised of methanol. In this connection, it is to be noted that as used in the present specification, the terms "complexing agent" and "catalyst modifier" are essentially synonymous. It should also be noted that the complexing agent and/or catalyst modifier combined with the catalyst to form the catalyst composition and the catalyst modifier added separately may desirably be the same compound, for example, methanol. Alternatively, the complexing agent and/or catalyst modifier combined with the catalyst to form the catalyst composition may be a different compound than the separately added catalyst modifier.

In still further accord with the concepts and principles of the invention, when the desired product is a highly reactive polyisobutylene, the ratio of $BF_3$ to methanol in said catalyst composition may desirably be no less than about 0.59:1, and ideally, should be in the range of from about 0.59:1 to about 0.62:1. In this latter regard, the ratio of $BF_3$ to methanol may ideally be maintained at about 0.60:1 or 0.61:1 in order to achieve highly reactive (high vinylidene) polyisobutylene.

In accordance with another preferred aspect of the invention, a sufficient amount of a catalyst modifier such as methanol may be independently introduced into the reactor to cause the ratio of $BF_3$ to methanol in said intimately intermixed reaction admixture catalyst composition to be maintained at a level of about 0.59:1, about 0.60:1, about 0.61:1 or to about 0.62:1 during the course of the reaction.

Ideally, the intimately intermixed reaction admixture catalyst composition may be maintained at a temperature of at least about 0° C. while the same is in said reaction zone and the introduction of said feedstock into said reaction zone and the withdrawal of said product stream from the reaction zone may be controlled such that the residence time of the isobutylene undergoing polymerization in the reaction zone is no greater than about 4 minutes.

In another aspect of the invention where the desired product is a mid-range vinylidene content polyisobutylene, the ratio of $BF_3$ to methanol in said catalyst composition may desirably be maintained at about 1:1. In further accordance with this aspect of the invention, a sufficient amount of a catalyst modifier such as methanol may be independently introduced to cause the ratio of $BF_3$ to methanol in said intimately intermixed reaction admixture catalyst composition to be maintained at approximately 1:1 during the course of the reaction.

In another important aspect of the invention, the same provides a single-stage liquid phase polymerization process for preparing a polyolefin product having preselected properties. In accordance with this aspect of the invention, the process may desirably comprise providing a liquid feedstock comprising at least one olefinic component, providing a catalyst composition comprising a complex of $BF_3$ and a complexing agent therefor, said complexing agent comprising a glycol or an aliphatic alcohol having a primary hydroxyl group and no hydrogen on a beta carbon, said complex being stable at temperatures needed to produce said polyolefin product, introducing said feedstock and said catalyst composition into a residual reaction mixture in a loop reactor reaction zone, recirculating the residual reaction mixture with the feedstock and the catalyst composition therein in said zone at a recirculation rate sufficient to cause intimate intermixing of the residual reaction mixture, the feedstock and the catalyst composition to thereby present a recirculating, intimately intermixed reaction admixture of the residual reaction mixture, the feedstock and the catalyst composition in said reaction zone, maintaining the recirculating intimately intermixed reaction admixture in its intimately intermixed condition and removing heat of reaction from the reaction admixture at a rate calculated to provide a substantially constant reaction temperature in the reaction admixture while the same is recirculating in said reaction zone, said constant reaction temperature being at a level appropriate for causing olefinic components introduced in said feedstock to undergo polymerization to form said polyolefin product in the presence of said catalyst composition, providing a catalyst modifier and introducing the same into said residual reaction mixture separately from said catalyst composition, withdrawing a product stream comprising polyolefin product and catalyst composition from said reaction zone; and controlling the introduction of said feedstock into said reaction zone and the withdrawal of said product stream from the reaction zone such that the residence time of the olefinic components undergoing polymerization in the reaction zone is appropriate for production of said polyolefin product.

In yet another important aspect, the invention provides a liquid phase polymerization process for preparing low molecular weight, highly reactive polyisobutylene which comprises providing a feedstock comprising isobutylene, providing a catalyst composition comprising a complex of $BF_3$ and a complexing agent therefor, introducing said feedstock and said catalyst composition into a residual reaction mixture in a reaction zone, intimately intermixing said residual reaction mixture, said feedstock and said catalyst composition to present an intimately intermixed reaction admixture in said reaction zone, maintaining the intimately intermixed reaction admixture in its intimately intermixed condition and keeping it at a temperature of at least about 0° C. while the same is in said reaction zone, to thereby cause the isobutylene therein to undergo polymerization to form said polyisobutylene, providing a catalyst modifier and introducing the same into said residual reaction mixture separately from said catalyst composition, withdrawing a product stream comprising low molecular weight, highly reactive polyisobutylene from said reaction zone, and controlling the introduction of said feedstock into said reaction zone and the withdrawal of said product stream from the reaction zone such that the residence time of the isobutylene undergoing polymerization in the reaction zone is no greater than about 4 minutes.

In further accord with the foregoing aspect of the invention, the polyisobutylene may desirably have an average molecular weight in the range of from about 500 to about 5000 and a vinylidene content of at least 70%, said catalyst composition may comprise a complex of $BF_3$ and a $C_1$ to $C_8$ primary alcohol, and the amount of catalyst complex introduced into said reaction zone may be controlled such that about 0.1 to about 10 millimoles of $BF_3$ are introduced for each mole of isobutylene introduced in said feedstock.

In still further accord with the foregoing aspect of the invention, the polyisobutylene may desirably have an average molecular weight in the range of from about 950 to about 1050, a polydispersity within the range of from about 1.3 to about 1.5 and a vinylidene content of at least about 80%, said feedstock may comprise at least about 30% by weight isobutylene, said catalyst composition may comprises a complex of $BF_3$ and methanol, the amount of catalyst complex introduced into said reaction zone may be controlled such that about 0.5 to about 2 millimoles of $BF_3$ are introduced for each mole of isobutylene introduced in said feedstock, and the introduction of said feedstock into said reaction zone and the withdrawal of said product stream from the reaction zone may be controlled such that the residence time of the isobutylene undergoing polymerization in the reaction zone is within the inclusive range of from about 45 to about 90 seconds.

In yet another preferred aspect of the invention, the reaction zone may desirably comprise a loop reactor wherein the reaction admixture is continuously recirculated at a first volumetric flow rate, and said feedstock and said catalyst composition are continuously introduced at a combined second volumetric flow rate.

In further accord with the preferred aspects of the invention, the catalyst modifier and/or the complexing agent, as the case may be, may be the same or different, and may each desirably comprise a $C_1$ to $C_8$ primary alcohol. More particularly and ideally, the catalyst modifier and/or the complexing agent, as the case may be, may each comprise methanol.

Preferably, in accordance with the concepts and principles of the invention where an isobutylene product is desired, the feedstock may desirably comprise at least about 30% by weight of said isobutylene.

Desirably, the reaction zone of the reactor may be a tube side of a shell-and-tube reactor and the heat of reaction is removed simultaneously with its generation by circulation of a coolant in the shell side of the exchanger. Ideally, a heat transfer coefficient U of at least about 50 Btu/min ft$^2$ ° F. is maintained in the reaction zone and the recirculation rate in the reactor may be sufficient to establish a Reynolds number of at least about 2000 in said zone.

In further accord with the concept and principles of the invention, the process may include a step of adding a quenching material capable of killing the catalyst to the withdrawn product stream. Such a step assists in controlling the molecular weight, and to some extent the isomeric composition of the olefinic product.

In another aspect, the invention provides a reactor apparatus for olefin polymerization which comprises at least one reactor defining a reaction zone and including an olefin polymerization reaction mixture inlet connection and an olefin polymerization reaction mixture outlet connection. These connections may desirably be in fluid communication with the reaction zone. The reactor is adapted and arranged to facilitate the conduct in the reaction zone of an exothermic olefin polymerization reaction on the reaction mixture in the presence of a catalyst composition comprising a catalyst and a catalyst modifier. In accordance with this aspect of the invention, the reactor apparatus further includes a feedstock inlet, a crude product outlet and a recirculation system including a pump arranged and adapted to circulate the reaction mixture in the zone independently of the introduction of feedstock into the reaction mixture via said feedstock inlet. The reactor apparatus of this aspect also includes a catalyst composition inlet in fluid communication with the zone facilitating the addition of catalyst composition to the olefin polymerization reaction mixture and at least one catalyst modifier inlet in fluid communication with the zone facilitating the addition of catalyst modifier to the olefin polymerization reaction mixture at a rate that is independent of the rate of addition of the catalyst composition.

Another important feature of the invention includes the provision of a method for operating an olefin polymerization reactor. This method includes the steps of providing an olefin polymerization reactor having a reaction zone, recirculating an olefin polymerization reaction mixture in the zone, introducing an olefin containing feedstock into said reaction mixture, said polymerization reaction mixture being recirculated at a flow rate which is independent of the rate of introduction of the feedstock into the recirculating olefin polymerization reaction mixture, introducing a catalyst composition comprising a catalyst and a catalyst modifier into the recirculating olefin polymerization reaction mixture, subjecting the polymerization reaction mixture to exothermic olefin polymerization reaction conditions in the zone in the presence of the catalyst composition, and introducing a catalyst modifier into the recirculating olefin polymerization reaction mixture at a rate that is independent of the rate of introduction of the catalyst composition.

In accordance with the concepts and principles of the invention, the foregoing system and methodology may be used in connection with a system and/or methodology which includes only a single reactor vessel or with one which includes a plurality of reactor vessels arranged in parallel as described in application Ser. No. 10/434,805 mentioned above. In this regard, it is to be noted that in accordance with the concepts and principles of the invention, an apparatus and/or a method is provided which may desirably pertain to the use of the described system for introducing catalyst modifier into the recirculating reaction mixture at a rate that is independent of the rate of introduction of the catalyst composition in combination with a multi-reactor system.

DETAILED DESCRIPTION OF THE PREFERRED EMBODIMENTS

Figure 1:
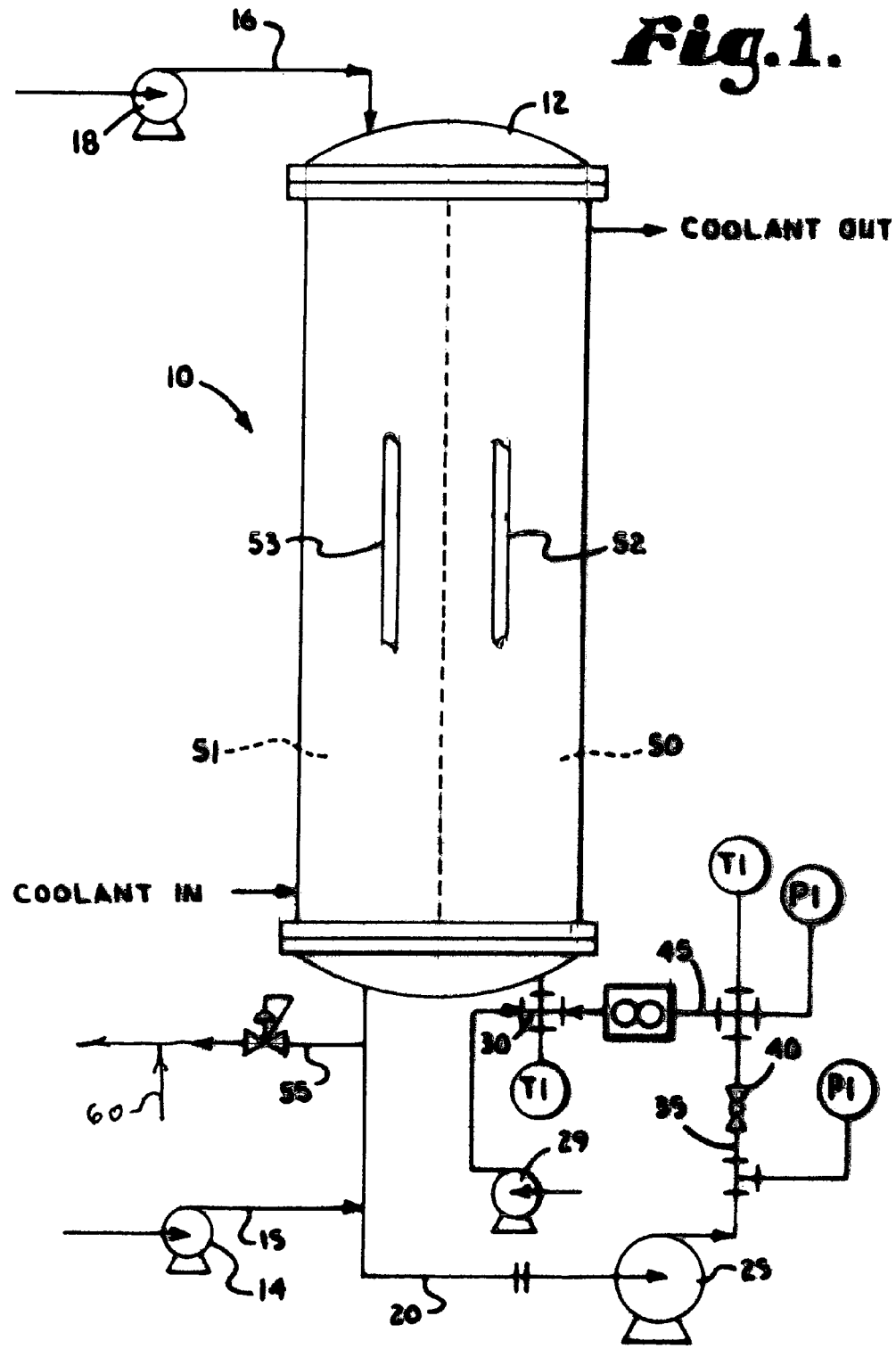
FIG. 1 is a schematic illustration of a reactor system including a multi-pass shell and tube heat exchanger and a recirculation system which is useful in connection with the invention.

Many potentially valuable reactors having utility in the conduct of liquid phase polymerization polyolefins are known to the routineers in the art to which the invention pertains. However, for purposes of one preferred embodiment of the present invention, the reactor desirably may include a two-pass shell-and-tube heat exchanger as shown in FIG. 1, where the same is identified by the numeral 10. The reactor 10 may, for example, include three hundred eighty eight (388) 0.375" tubes with a wall thickness of 0.035", each thereby providing an internal tube diameter of 0.305". The reactor may be twelve feet long and may have internal baffling and partitions to provide 2 passes with 194 tubes per pass. The passes are identified by the numerals 50 and 51 in FIG. 1, and the 194 tubes of each pass are respectively represented by the single tube portions 52 and 53. Such construction is well known in the heat exchanger and reactor arts and no further explanation is believed necessary.

In operation, an olefin (e.g., isobutylene, 1-butene, 2-butene) containing feedstock enters the reactor system via pump 14 and pipe 15. The downstream end of pipe 15 desirably may be located to direct the feed stock into the suction line 20 of recirculation pump 25. A catalyst composition may be injected into the reactor circulation system via pump 29 and pipe 30 at a location downstream from pump 25 and adjacent the first pass as shown in FIG. 1. For some applications, where high vinylidene content is desired, the catalyst composition may desirably be a methanol/$BF_3$ complex with a molar ratio of methanol to $BF_3$ of about 2:1 or less. In this connection, the molar methanol to $BF_3$ ratio should desirably be no more than about 1.7:1 and no less than about 1.6:1. For other applications where high vinylidene content is not paramount, the molar ratio of methanol to $BF_3$ may be as low as about 1.1:1 or less and even perhaps as low as 1:1 for some applications.

Circulation pump 25 pushes the reaction mixture through line 35, control valve 40 and line 45 into the bottom head 11 of the reactor 10. A flow meter 46 may be positioned in line 45 as shown. Appropriate temperature indicators TI and pressure indicators PI may be provided to monitor the system. The reaction mixture travels upwardly through tubes 52 of pass 50 and downwardly through tubes 53 of pass 51. The circulating reaction mixture leaves reactor 10 via suction line 20. The reactor system thus is of the type which is sometimes referred to as a loop reactor. With this system, which is only a preferred system since there are many other arrangements which would be apparent to those of ordinary skill in the art, the flow rate of the reactant mixture in the reactor may be adjusted and optimized independently of feed stock introduction and product removal rates so as to achieve thorough intermixing of the catalyst composition and the reactants and appropriate temperature control.

As explained previously, each pass 50 and 51 may desirably include one hundred ninety four (194) separate tubes. For clarity, however, only a portion of a single tube is illustrated schematically in each pass in FIG. 1. These tubes are identified by the respective reference numerals 52 and 53. Although only a portion of each representative tube 52 and 53 is shown, it should be appreciated by those skilled in the art that each of these tubes extends for the entire distance between top head 12 and bottom head 11 and that the same are in fluid communication with the interiors of heads 11 and 12.

It is to be noted here, that the reaction mixture should preferably be circulated through the tubes 52, 53 of the reactor at a flow rate sufficient to create some degree of turbulence in the flowing liquid, whereby to achieve intimate intermixing between the catalyst composition and the reactants and a heat transfer coefficient appropriate to provide proper cooling. In this regard, the flow rate, the reaction mixture properties, the reaction conditions and the reactor configuration should be appropriate to produce a Reynolds number (Re) in the range of from about 2000 to about 3000 or even greater, and a heat transfer coefficient (U) in the range of from about 50 to about 150 Btu/min ft$^2$ ° F. in the tubes 52, 53 of the reactor. Such parameters may generally be obtained when the linear flow rate of a typical reaction mixture through a tube having an internal diameter of 0.331 inch is approximately within the range of from about 6 to 9 feet per second.

A product exit line 55 may desirably be connected in fluid communication with pump suction line 20. However, as would be readily appreciated by those skilled in the art, the exit line could be positioned almost anywhere in the system since, at least from a theoretical view point, and as explained below, the conditions in the reactor may desirably approach those of a continuous stirred tank reactor (CSTR) where both temperature and composition remain constant such that the composition of the product stream leaving the reactor is identical to the composition of the reaction mixture recirculating in the reactor. Likewise, the feedstock introduction line 15 could be positioned almost anywhere in the system, although, in practice, it is desirable for the line 15 to be connected into the recirculation system at a position that is as far upstream from the line 55 as possible to insure that monomers introduced via line 15 have a maximum opportunity to polymerize before encountering line 55.

A coolant may desirably be circulated on the shell side of the reactor at a rate to remove heat of reaction and maintain a desired temperature in the reactor.

A catalyst complexing agent (catalyst modifier) may desirably be added separately to the circulating reaction mixture via pump 18 and line 16 positioned in top head 12. This feature is particularly valuable when the desired product is highly reactive polyisobutylene (HR PIB) and the catalyst composition comprises a $BF_3$ catalyst and a methanol complexing agent. $BF_3$ complexes with methanol in two different forms, i.e., mono-complex (1 mole of $BF_3$ to 1 mole of methanol) and di-complex (1 mole of $BF_3$ to 2 moles of methanol), depending upon the availability of methanol. The mono-complex is believed to be the true catalytic species, whereas the di-complex does not have any particular catalytic properties in the absence of the mono-complex. References to fractional complexes are the actual average of the mono-complex and the di-complex. In this regard it has been determined that a catalyst composition made up of from about 0.59 to 0.62 moles of $BF_3$ per mole of methanol is particularly valuable in the production of HR PIB. But when such a composition is introduced into the system, variations and contaminants in the hydrocarbon feed often may result in less than optimal reactor control. This is believed to be, at least in part, the result of the propensity for many contaminants to effectively increase the apparent ratio of methanol to catalyst in the composition. Moreover, it is not always possible to predetermine the exact contamination level of some feedstocks.

In accordance with the concepts and principles of the invention, however, it has been discovered that these problems may be solved and optimal results may be achieved by introducing a catalyst composition, which for some purposes may desirably be a methanol lean composition, e.g., one containing more than the optimum desired concentration of the mono-complex, into the reactor 10 via line 30, and independently adding relatively pure methanol through a line that may desirably be spaced from line 30, such as the line 16. A pump 18 may desirably be provided to push the methanol through pipe 16. Alternatively, essentially the same effect may be achieved by introducing a separate methanol stream directly into the catalyst composition stream in line 30 by way of a line (not shown) and introducing the added methanol and the catalyst composition into the system together. In either event, the additional methanol added separately is available to trim the catalyst composition so that a desired methanol to $BF_3$ ratio may be achieved and maintained in the reactor 10.

In further accordance with the concepts and principles of the invention, the amount of methanol added should desirably be sufficient to create and maintain a preferred ratio of $BF_3$ per mole of methanol in the circulating reaction mixture. For some applications, for example where a highly reactive polyisobutylene is the desired product, the catalyst composition added via line 30 may desirably comprise a molar ratio of $BF_3$ and methanol in the range of from about of 0.59:1 to about 0.62:1, and ideally may be about 0.61:1. Alternatively, for other applications, for example where the desired product is a polyisobutylene where the vinylidene content is not so important, the catalyst composition added via line 30 may comprise a molar ratio of $BF_3$ and methanol of about 1:1.

The product exiting the system via line 55 should be quickly quenched with a material capable of killing the activity of the catalyst, such as, for example, ammonium hydroxide, so that the ongoing exothermic polymerization reactions are immediately stopped. Thus, any undesired temperature increase due to a lack of cooling (and the concomitant production of lower molecular weight polymers due to the higher temperatures) or rearrangement of the polymer molecules may be minimized. The polyolefin products of the invention may then be directed to a work up system, including a wash system where catalyst salts may be removed and a purification and separation system where the polyolefin product may be separated from unreacted monomers, dimers, oligomers and other undesirable contaminants such as diluents, etc. These latter materials may then be recycled or diverted for other uses employing known methodology.

With the described recirculation system, the rate of feedstock introduction into the reaction mixture and the rate of product removal are each independent of the circulation rate. As will be appreciated by those of ordinary skill in the art, the number of passes through the reactor and the size and configuration of the latter are simply matters of choice. For a single reactor system as illustrated in FIG. 1, the feedstock and product withdrawal flow rates may preferably be chosen such that the residence time of the fresh monomers entering the reactor with the feedstock is 4 minutes or less, desirably 3 minutes or less, preferably 2 minutes or less, even more preferably 1 minute or less, and ideally less than 1 minute. In connection with the foregoing, the residence time is defined as the total reactor system volume divided by the volumetric flow rate of the feedstock entering the system via pipe 15.

The recirculation flow rate, that is the flow rate of the reaction mixture in the system induced by the recirculation pump 25, is controlled, as described above, to achieve appropriate turbulence and/or heat transfer characteristics. This recirculation flow rate is often a function of the system itself and other desired process conditions. For the systems described above, the ratio of the recirculation flow rate to the incoming feedstock flow rate (recycle ratio) should generally be maintained in the range of from about 20:1 to about 50:1, desirably in the range of from about 25:1 to about 40:1, and ideally in the range of from about 28:1 to about 35:1. In particular, in addition to causing turbulence and providing an appropriate heat transfer coefficient, the recirculation flow rate of the reaction mixture should be sufficient to keep the concentrations of the ingredients therein essentially constant and/or to minimize temperature gradients within the circulating reaction mixture, whereby essentially isothermal conditions are established and maintained in the reactor.

As mentioned above, the recycle ratios generally may be in the range of from about 20:1 to about 50:1. Higher recycle ratios increase the degree of mixing and the reactor approaches isothermal operation leading to narrower polymer distributions. But higher recycle ratios also result in higher power consumption. Lower recycle ratios decrease the amount of mixing in the reactor, and as a result, there is a greater discrepancy in the temperature profiles. As the recycle ratio approaches zero, the design equations for the reactor reduce to those for a plug flow reactor model. On the other hand, as the recycle ratio approaches infinity, the modeling equations reduce to those for a CSTR. When CSTR conditions are achieved, both temperature and composition remain constant and the composition of the product stream leaving the reactor is identical to the composition of the reaction mixture recirculating in the reactor. Needless to say, after equilibrium has been established, as feedstock enters the system, an equal mass of product is pushed out of the reactor loop. Thus, under CSTR conditions, the point at which the product stream is withdrawn is independent of reactor geometry.

The feedstock entering the system through line 15 may be any olefin containing stream. Where polyisobutylene is the preferred product, the feedstock may be, e.g., isobutylene concentrate, dehydro effluent, or a typical raff-1 stream. These feedstock materials are described respectively below in Tables 1, 2 and 3.

TABLE 1

Isobutylene Concentrate

| Ingredient | Weight % |
|---|---|
| $C_3s$ | 0.00 |
| I-butane | 6.41 |
| n-butane | 1.68 |
| 1-butene | 1.30 |
| I-butene | 89.19 |
| trans-2-butene | 0.83 |
| cis-2-butene | 0.38 |
| 1,3-butadiene | 0.21 |

TABLE 2

Dehydro Effluent

| Ingredient | Weight % |
|---|---|
| $C_3s$ | 0.38 |
| I-butane | 43.07 |
| n-butane | 1.29 |
| 1-butene | 0.81 |
| I-butene | 52.58 |
| trans-2-butene | 0.98 |
| cis-2-butene | 0.69 |
| 1,3-butadiene | 0.20 |

TABLE 3

Raff-1

| Ingredient | Weight % |
|---|---|
| $C_3s$ | 0.57 |
| I-butane | 4.42 |
| n-butane | 16.15 |

TABLE 3-continued

Raff-1

| Ingredient | Weight % |
|---|---|
| 1-butene | 37.22 |
| I-butene | 30.01 |
| trans-2-butene | 8.38 |
| cis-2-butene | 2.27 |
| 1,3-butadiene | 0.37 |
| MTBE | 0.61 |

On the other hand, suitable streams for the production of polyolefins generally may include feedstock materials such as those described in Tables 4 and 5.

TABLE 4

2-Butene Rich Stream

| Ingredient | Weight % |
|---|---|
| I-butane | 2.19 |
| n-butane | 61.50 |
| 1-butene | 0.64 |
| trans-2-butene | 28.18 |
| cis-2-butene | 7.49 |

TABLE 5

1-Decene Rich Stream

| Ingredient | Weight % |
|---|---|
| 1-decene | 94.00 |
| $C_{10}$ isomers | 6.00 |

Figure 2:
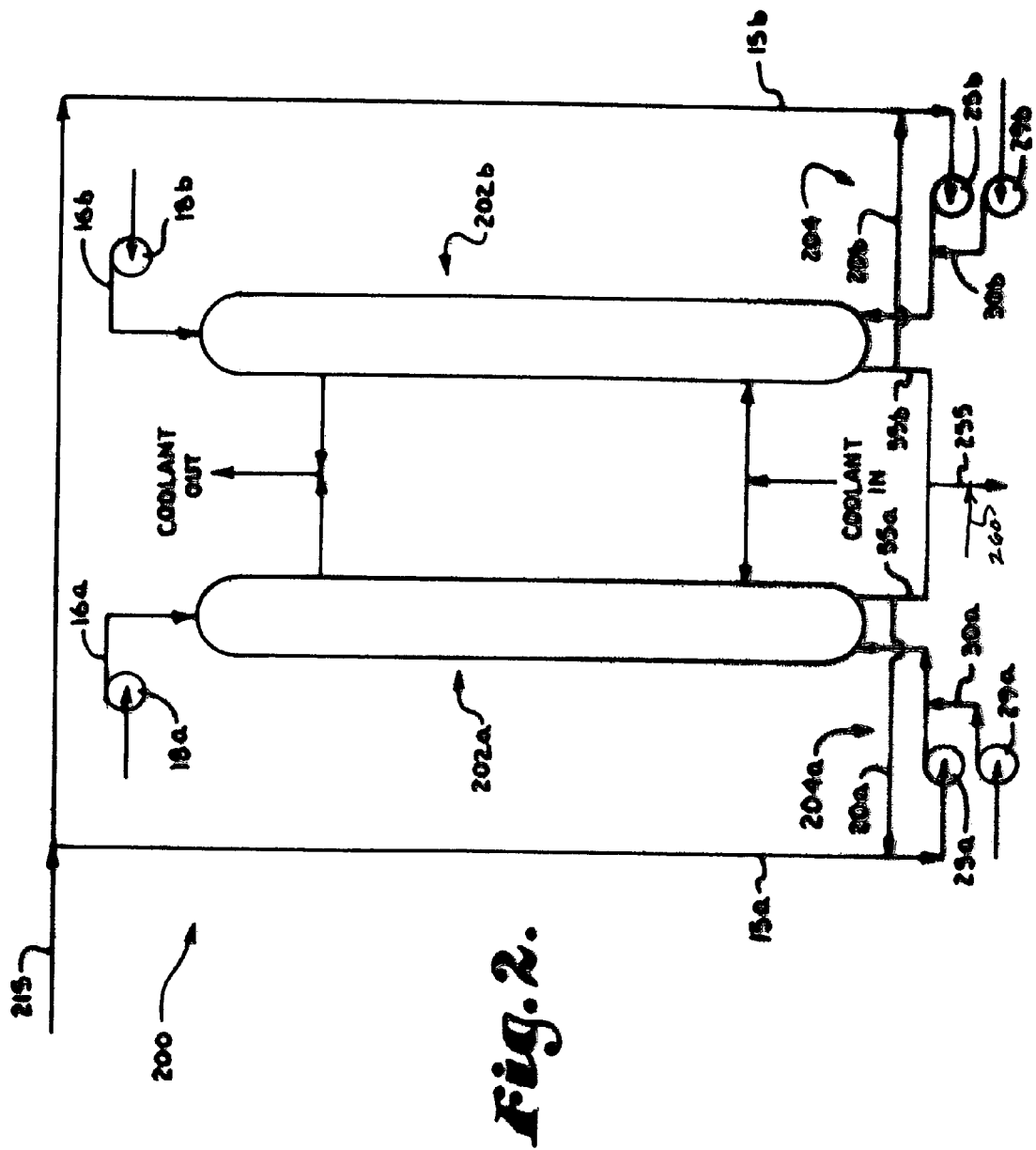
FIG. 2 is a flow diagram illustrating an apparatus which embodies the concepts and principles of the invention and which employs two reactors of the sort illustrated in FIG. 1 arranged for operation in parallel.

With reference to FIG. 2, and in further accordance with the concepts and principles of the invention, it has been discovered that an operating system incorporating a plurality of reactors arranged for operation in parallel provides a great deal more operating flexibility than a single larger reactor sized for the same total production rate. In fact, the multiple reactor concept of the invention provides for less risk in operation, more flexibility in running the process, lower feed rates (higher conversions), improved reactor design, and increased production capability per unit of time. Moreover, the multiple reactor concept of the invention allows, e.g., for a 20:1 scale-up from pilot plant operation when the system includes two reactors, rather than a 40:1 scale-up with a larger reactor. This significantly reduces the uncertainties associated with scaling up pilot plant data.

A multiple reactor system which embodies the concepts and principles of the invention is illustrated in FIG. 2, where it is identified broadly by the reference numeral 200. System 200 includes two reactors 202a and 202b, which as shown are connected for parallel operation on both the reaction side and on the cooling fluid side. In addition, each reactor 202a, 202b, desirably has its own respective recirculation system, 204a, 204b. Ideally, the reactors 202a and 202b may be identical. However, in accordance with the broad aspects of the invention, it is not a critical feature of the invention for the reactors to be identical.

Ideally, the reactors 202a, 202b may each be essentially the same as the reactor 100 illustrated in FIG. 1. That is to say, the reactors 202a, 202b may each be a two-pass reactor, with each pass including one hundred ninety four ⅜" tubes as described above. Other equipment shown in FIG. 2 which is essentially the same as the corresponding equipment shown in FIG. 1 is identified by similar reference numerals followed by either an "a" or a "b" as the case may be. Thus, the reactors 202a, 202b each include a feedstock inlet line (15a, 15b), a recirculation pump (25a, 25b), a recirculation pump suction line (20a, 20b), a product outlet line (55a, 55b), a catalyst composition inlet line (30a, 30b) and a methanol inlet line (16a, 16b). In FIG. 2, a common feedstock inlet line for the multiple reactor system 200 is identified by the reference numeral 215, and a common product outlet line for the multiple reactor system 200 is identified by the reference numeral 255.

The multiple reactor system of the invention offers advantages in conversion and polymer polydispersity. The multiple reactor system of the invention also facilitates a reduction in the amount of off-spec material generated during early operation of the unit because equilibrium and the development of the operating parameters necessary for a particular product are achieved more expeditiously.

The optimum inlet feedstock flow rate for each reactor of the multiple reactor system 200 of the invention is about fifteen to seventeen gal/min with appropriate refrigeration capacity and back-end processing capabilities. That is to say, with the multiple reactor system 200 of the invention, higher conversions (70–75%) are possible at this flow rate than higher flow rates (>20 gal/min per reactor). This is the result of increased residence times in the range of from about 120 to 135 seconds. Higher conversion rates lead to improvements (reductions) in polydispersity, and a polydispersity of about 1.7 is achievable through the use of the multiple reactor system 200 of the invention for the production of a PIB product having a number average molecular weight ($M_N$) of about 950, and a polydispersity of about 2.2 is achievable through the use of the multiple reactor system 200 of the invention for the production of a PIB product having a $M_N$ of about 2300. When using a single reactor to produce the same molecular weight products, the best polydispersities that could be achieved were 1.9 and 2.3 respectively.

For the dual reactor system described above, the feedstock and product withdrawal flow rates may preferably be chosen such that the residence time of the reaction mixture within each reactor may be, for example, about 4 minute or less, about 3 minutes or less, ideally from about 120 to about 135 seconds, perhaps even less than about 2 minutes, and potentially even as low as about 1 minute or less.

The multiple reactor system 200 of the invention also facilitates the use of smaller reactors having improved pressure drop characteristics resulting in more efficient energy usage. This may be due at least in part to the fact that larger reactors may require longer reactor tubes with similar recirculation linear flow rates. The system 200 is described more fully in said application Ser. No. 10/434,805.

As mentioned above, product exiting the polymerization reactor system via lines 55 (FIG. 1) or 255 (FIG. 2) should be quenched immediately with a material capable of killing the activity of the catalyst, such as, for example, ammonium hydroxide. Thus, any potential undesired decrease in molecular weight or rearrangement of the polymer molecule may be minimized. For this purpose, and with reference to FIG. 1, an agent for killing the activity of any residual catalyst in the crude product leaving reactor 10 via line 55 may be introduced into the latter by way of a line 60. Similarly, and with reference to FIG. 2, an agent for killing the activity of any residual catalyst in the crude product leaving reactor system 200 via line 255 may be introduced into the latter by way of a line 260. $NH_4OH$ in an aqueous solution is a particularly good agent for killing the activity of any residual BF3/methanol complex in the polyolefin product. However, the invention is in no way limited to the use of $NH_4OH$. Rather, the exact nature of the catalyst activity killing agent will depend entirely upon the nature of the catalyst itself and/or the nature of the product in the product stream. After quenching, the polyolefin products of the invention may then be directed to a work up system, including, for example, a wash system such as described in application Ser. No. 10/434,805, where catalyst salts may be removed. In addition, apparatus for removing undesirable components such as, for example, diluents, unreacted monomer, and unwanted light ends such as dimers, trimers, oligomers, etc. may be provided downstream from the wash system.

We claim:

1. A method for conducting an olefin polymerization reaction comprising:

recirculating an olefin polymerization reaction mixture in a reaction zone of an olefin polymerization reactor;

introducing an olefin containing feedstock into said recirculated olefin polymerization reaction mixture, said olefin polymerization reaction mixture being recirculated at a flow rate which is independent of the rate of introduction of said feedstock into said zone;

introducing a catalyst composition comprising a catalyst and a catalyst modifier into said reaction mixture;

subjecting said polymerization reaction mixture to exothermic olefin polymerization reaction conditions in said zone in the presence of said catalyst composition; and introducing a catalyst modifier into said recirculating olefin polymerization reaction mixture at a rate which is independent of the rate of introduction of said catalyst composition into said zone.

2. A liquid phase polymerization process for preparing polyisobutylene, said process comprising:

providing a feedstock comprising isobutylene;

providing a catalyst composition comprising a complex of $BF_3$ and a complexing agent;

introducing said feedstock and said catalyst composition into a reaction mixture in a reaction zone;

intimately intermixing said reaction mixture, said feedstock and said catalyst composition to present an intimately intermixed reaction admixture in said reaction zone;

maintaining the intimately intermixed reaction admixture in its intimately intermixed condition while the same is in said reaction zone, to thereby cause the isobutylene therein to undergo polymerization to form polyisobutylene;

introducing an additional amount of said complexing agent into said intimately intermixed reaction admixture at a rate which is independent of the rate of introduction of said catalyst composition; and withdrawing a product stream comprising polyisobutylene from said reaction zone.

3. A process as set forth in claim 2, said reaction zone comprising a loop reactor wherein the reaction admixture is continuously recirculated at a first volumetric flow rate, and said feedstock and said catalyst composition are continuously introduced at a combined second volumetric flow rate.

4. A process as set forth in claim 3, wherein said complexing agent comprises methanol.

5. A process as set forth in claim 4, wherein the product is a highly reactive polyisobutylene and the ratio of $BF_3$ to methanol in said catalyst composition is no less than about 0.59:1.

6. A process as set forth in claim 4, wherein the product is a highly reactive polyisobutylene and the ratio of $BF_3$ to methanol in said catalyst composition is in the range of from about 0.59:1 to about 0.62:1.

7. A process as set forth in claim 5, wherein the product is a highly reactive polyisobutylene and a sufficient amount of methanol is independently introduced to cause the ratio of $BF_3$ to methanol in said intimately intermixed reaction admixture catalyst composition to be maintained in the range of from about 0.59:1 to about 0.60:1 during the course of the reaction.

8. A process as set forth in claim 6, wherein a sufficient amount of methanol is independently introduced to cause the ratio of $BF_3$ to methanol in said intimately intermixed reaction admixture catalyst composition to be maintained at approximately 0.59:1 to about 0.62:1 during the course of the reaction.

9. A process as set forth in claim 3, wherein said intimately intermixed reaction admixture catalyst composition is maintained at a temperature of at least about 0° C. while the same is in said reaction zone.

10. A process as set forth in claim 3, including controlling the introduction of said feedstock into said reaction zone and the withdrawal of said product stream from the reaction zone such that the residence time of the isobutylene undergoing polymerization in the reaction zone is no greater than about 4 minutes.

11. A process as set forth in claim 9, including controlling the introduction of said feedstock into said reaction zone and the withdrawal of said product stream from the reaction zone such that the residence time of the isobutylene undergoing polymerization in the reaction zone is no greater than about 4 minutes.

12. A process as set forth in claim 10, wherein the introduction of said feedstock into said reaction zone and the withdrawal of said product stream from the reaction zone are controlled such that the residence time of the isobutylene undergoing polymerization in the reaction zone is no greater than about 3 minutes.

13. A process as set forth in claim 11, wherein the introduction of said feedstock into said reaction zone and the withdrawal of said product stream from the reaction zone are controlled such that the residence time of the isobutylene undergoing polymerization in the reaction zone is no greater than about 3 minutes.

14. A process as set forth in claim 10, wherein the introduction of said feedstock into said reaction zone and the withdrawal of said product stream from the reaction zone are controlled such that the residence time of the isobutylene undergoing polymerization in the reaction zone is no greater than about 200 seconds.

15. A process as set forth in claim 11, wherein the introduction of said feedstock into said reaction zone and the withdrawal of said product stream from the reaction zone are controlled such that the residence time of the isobutylene undergoing polymerization in the reaction zone is no greater than about 200 seconds.

16. A process as set forth in claim 4, wherein the product is a mid-range vinylidene content polyisobutylene and the ratio of $BF_3$ to methanol in said catalyst composition is about 1:1.

17. A process as set forth in claim 5, wherein the product is a mid-range vinylidene content polyisobutylene and a sufficient amount of methanol is independently introduced to cause the ratio of $BF_3$ to methanol in said intimately intermixed reaction admixture catalyst composition to be maintained at approximately 1:1 during the course of the reaction.

18. A single-stage liquid phase polymerization process for preparing a polyolefin product having preselected properties, said process comprising:

providing a liquid feedstock comprising at least one olefinic component;

providing a catalyst composition comprising a complex of $BF_3$ and a complexing agent therefor, said complexing agent comprising a glycol or an aliphatic alcohol having a primary hydroxyl group and no hydrogen on a beta carbon, said complex being stable at temperatures needed to produce said polyolefin product;

introducing said feedstock and said catalyst composition into a residual reaction mixture in a loop reactor reaction zone;

recirculating the residual reaction mixture with the feedstock and the catalyst composition therein in said zone at a recirculation rate sufficient to cause intimate intermixing of the residual reaction mixture, the feedstock and the catalyst composition to thereby present a recirculating, intimately intermixed reaction admixture of the residual reaction mixture, the feedstock and the catalyst composition in said reaction zone;

maintaining the recirculating intimately intermixed reaction admixture in its intimately intermixed condition and removing heat of reaction from the reaction admixture at a rate calculated to provide a substantially constant reaction temperature in the reaction admixture while the same is recirculating in said reaction zone, said constant reaction temperature being at a level appropriate for causing olefinic components introduced in said feedstock to undergo polymerization to form said polyolefin product in the presence of said catalyst composition;

providing a catalyst modifier and introducing the same into said residual reaction mixture separately from said catalyst composition;

withdrawing a product stream comprising polyolefin product and catalyst composition from said reaction zone; and controlling the introduction of said feedstock into said reaction zone and the withdrawal of said product stream from the reaction zone such that the residence time of the olefinic components undergoing polymerization in the reaction zone is appropriate for production of said polyolefin product.

19. A liquid phase polymerization process for preparing low molecular weight, highly reactive polyisobutylene, said process comprising: providing a feedstock comprising isobutylene; providing a catalyst composition comprising a complex of $BF_3$ and a complexing agent therefor; introducing said feedstock and said catalyst composition into a residual reaction mixture in a reaction zone; intimately intermixing said residual reaction mixture, said feedstock and said catalyst composition to present an intimately intermixed reaction admixture in said reaction zone; maintaining the intimately intermixed reaction admixture in its intimately intermixed condition and keeping it at a temperature of at least about 0° C. while the same is in said reaction zone, to thereby cause the isobutylene therein to undergo polymerization to form said polyisobutylene; providing a catalyst modifier and introducing the same into said residual reaction mixture separately from said catalyst composition; withdrawing a product stream comprising low molecular weight, highly reactive polyisobutylene from said reaction zone; and controlling the introduction of said feedstock into said reaction zone and the withdrawal of said product stream from the reaction zone such that the residence time of the isobutylene undergoing polymerization in the reaction zone is no greater than about 4 minutes.

20. A liquid phase polymerization process as set forth in claim 19, wherein said polyisobutylene has an average molecular weight in the range of from about 500 to about 5000 and a vinylidene content of at least 70%, said catalyst composition comprises a complex of $BF_3$ and a $C_1$ to $C_8$ primary alcohol, and the amount of catalyst complex introduced into said reaction zone is controlled such that about 0.1 to about 10 millimoles of $BF_3$ are introduced for each mole of isobutylene introduced in said feedstock.

21. A liquid phase polymerization process as set forth in claim 19, wherein said polyisobutylene has an average molecular weight in the range of from about 950 to about 1050, a polydispersity within the range of from about 1.3 to about 1.5 and a vinylidene content of at least about 80%, said feedstock comprises at least about 40% by weight isobutylene, said catalyst composition comprises a complex of $BF_3$ and methanol, the amount of catalyst complex introduced into said reaction zone is controlled such that about 0.5 to about 2 millimoles of $BF_3$ are introduced for each mole of isobutylene introduced in said feedstock, and the introduction of said feedstock into said reaction zone and the withdrawal of said product stream from the reaction zone are controlled such that the residence time of the isobutylene undergoing polymerization in the reaction zone is within the inclusive range of from about 45 to about 90 seconds.

22. A process as set forth in claim 19, said reaction zone comprising a loop reactor wherein the reaction admixture is continuously recirculated at a first volumetric flow rate, and said feedstock and said catalyst composition are continuously introduced at a combined second volumetric flow rate.

23. A process as set forth in claim 20, said reaction zone comprising a loop reactor wherein the reaction admixture is continuously recirculated at a first volumetric flow rate, and said feedstock and said catalyst composition are continuously introduced at a combined second volumetric flow rate.

24. A process as set forth in claim 21, said reaction zone comprising a loop reactor wherein the reaction admixture is continuously recirculated at a first volumetric flow rate, and said feedstock and said catalyst composition are continuously introduced at a combined second volumetric flow rate.

25. A process as set forth in claim 18 or 19, wherein said catalyst modifier comprises essentially the same composition as said complexing agent.

26. A process as set forth in claim 18 or 19, wherein said catalyst modifier comprises a $C_1$ to $C_8$ primary alcohol.

27. A process as set forth in claim 18 or 19, wherein said complexing agent comprises a $C_1$ to $C_8$ primary alcohol.

28. A process as set forth in claim 25, wherein said same composition comprises a $C_1$ to $C_8$ primary alcohol.

29. A process as set forth in claim 18 or 19, wherein said catalyst modifier comprises methanol.

30. A process as set forth in claim 18 or 19, wherein said complexing agent comprises methanol.

31. A process as set forth in claim 25, wherein said same composition comprises methanol.

32. A process as set forth in claim 19, 22, 23 or 24, wherein said feedstock comprises at least about 30% by weight of said isobutylene.

33. A process as set forth in claim 18, 19, 20 or 21, wherein the reaction zone is a tube side of a shell-and-tube reactor and the heat of reaction is removed simultaneously with its generation by circulation of a coolant in the shell side of the exchanger.

34. A process as set forth in claim 29, wherein a heat transfer coefficient U of at least about 50 Btu/min ft$^2$ ° F. is maintained in the reaction zone.

35. A process as set forth in claim 18, 19, 20 or 21, wherein said recirculation rate is sufficient to establish a Reynolds number of at least about 2000 in said zone.

36. A process as set forth in claim 18, 19, 20 or 21, wherein is included a step of adding a quenching material capable of killing the catalyst to the withdrawn product stream.

* * * * *